J. J. MAHAN.

TOY.

APPLICATION FILED OCT. 18, 1913.

Reissued Mar. 10, 1914. 13,696.

Attest:
Mary H. Lewis
Helen V. Fitzpatrick by

Inventor:
James J. Mahan
S. J. Cox. Atty.

UNITED STATES PATENT OFFICE.

JAMES J. MAHAN, OF JERSEY CITY, NEW JERSEY, ASSIGNOR TO S. M. JACKSON JACOBS, OF NEW YORK, N. Y.

TOY.

13,696. Specification of Reissued Letters Patent. Reissued Mar. 10, 1914.

Original No. 1,007,218, dated October 31, 1911, Serial No. 541,801. Application for reissue filed October 18, 1913. Serial No. 796,095.

*To all whom it may concern:*

Be it known that I, JAMES J. MAHAN, a citizen of the United States, and a resident of Jersey City, in the county of Hudson and State of New Jersey, have invented certain new and useful Improvements in Toys, of which the following is a specification.

The invention relates to toys, and particularly to such as are commonly known as walking toys. Its objects are, among others, to provide a novel and amusing device of this character which will travel on an inclined plane without other means of propulsion than gravity and which may be constructed of simple, inexpensive and durable parts.

The invention consists in the construction, combination and arrangement of parts hereinafter described and claimed and illustrated in the accompanying drawings.

Figure 1:
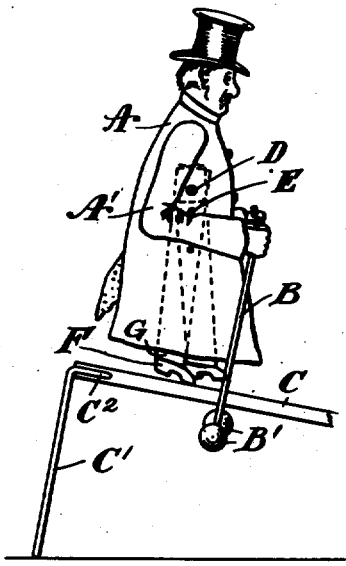
Figure 2:
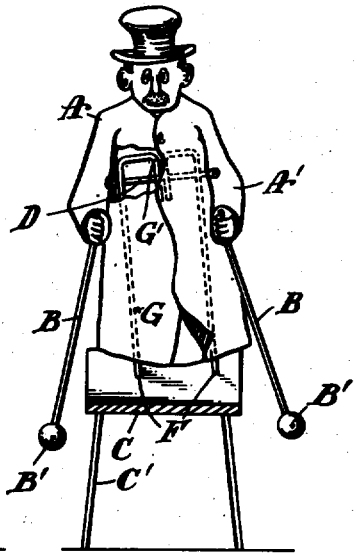
Figure 3:
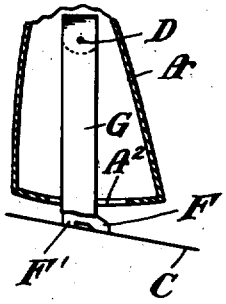
Figure 4:
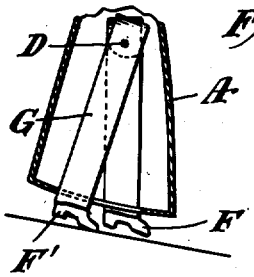

In the said drawings Figure 1 is a side view of a walking toy embodying the improvements. Fig. 2 is a front view of the same. Fig. 3 is a vertical medial section of the lower part of the toy, and Fig. 4 is a like section taken near one side.

The exterior of the mechanism A may be formed so as to represent a grotesque human figure or any other object, and is provided with arms A′ rigidly attached to the body portion and extending slightly forward of the same on either side provided with balancing rods B having weights B′ at their lower ends. These rods extend on oblique lines from the figure, and their length and direction will depend upon the width of the inclined plane C, the distance between the feet of the figure and the other proportions of the figure. By giving them different angles a different movement or "walk" may also be given to the said figure, and it will, therefore, be understood that the length and angle of these rods may be varied as desired for these purposes.

The inclined platform or walk C is mounted on suitable legs connected by means of a U-shaped offset portion $C^2$ of the legs which is received by a horizontal cut in the end of the platform. The legs are made of one piece of material, and one pair may be provided for each end of the platform, those at one end being longer than those of the other so as to give the proper inclination.

The pivot D upon which the legs G swing pendulum-fashion passes through suitable openings E in the outer shell or casing of the moving figure and through the upper ends of the legs. A plurality of these openings E are provided for the purpose of moving the pivot vertically and thus varying the movements of the toy and adjusting it to differently inclined surfaces. The preferred location of the pivot, however, is above the arms, so that the balancing rods B are between the pivot and the feet. This arrangement tends toward stability and gives the figure a regular and certain movement. A pivot hole, however, is provided below the point at which the rods are attached, and may be used, if desired, for the purpose of giving the figure a more erratic and uncertain movement due to the fact that the weight is above the pivot and the center of gravity is, therefore, more easily affected. The upper ends of the legs G are bent over to form hooks G′ for the purpose of spacing the legs apart and preventing them moving laterally on the pivot. This is brought about by the fact that the pivot passes through the turned-down end G′ as well as through the leg proper.

The feet F at the lower end of the legs are of peculiar formation. The bottom of each foot is inclined upwardly from toe to heel, so that when the foot is resting on the incline and parallel therewith the figure will be substantially erect. In this manner a better simulation of human perambulation is attained. The hollow between the toe and the heel is exaggerated and the forward vertical edge of the heel is inclined backward. This gives the feet a better hold on the platform, prevents the figure from slipping and also prevents it from walking off the lower end of the platform.

The operation of the device is as follows: The figure is placed near the upper end of the incline and given a slight sidewise rocking motion. This causes one of the feet to be lifted from the platform, and permits the figure to tilt forward under the weight of the bars B. This motion causes the lifted foot to swing forward so that the figure is caught, after falling a short distance, by this foot. At this moment the figure swings toward the other side under the influence of the rods B and the opposite foot is thus lifted and permitted to fall forward. This movement continues until the figure reaches the end of the platform, when the foot which last falls forward will pass off the end and will, therefore, not cause the opposite foot to be raised when the figure swings toward its side. If the foot chances to slip on the lower edge of the platform the forward edge of the heel will catch on the side edge so that the figure will merely lean forward over the lower end of the platform and recover its equilibrium. The movements of the legs are limited by slots $A^2$ in the bottom of the casing, and where a narrow platform, such as is shown, is used, the figure is prevented from slipping off sidewise by the bars B which check its sidewise movement in either direction. When the figure leans forward on reaching the lower end of the platform the weights B′ are thrown back on the opposite side of the feet so that the body balances and remains on the platform.

In order to cause the figure to shift its weight from one foot to the other and to permit the feet to swing freely forward over the platform and be raised from contact therewith alternately it is necessary to have the weights B′ at the lower ends of the rods B close enough to the center of gravity so that the figure will not lean too far forward and thus cause the platform to interfere with or retard these movements. In constructing toys, therefore, in accordance with the present improvements it is advisable to place said weights and arms about as shown in the drawings, and then if the figure does not balance properly and perform the desired walking motions to bend the rods backward gradually until the proper balance is attained. The point to which the weight must thus be moved will depend upon the weight of the different portions of the body, the distance of the point of attachment of the balance rods from the leg pivot, the angle of the platform and other details, and must be determined by experiment, as above indicated, in each case. The position of the weights should be the same in all other figures of the same construction when this point is determined.

Where the words "normal center of gravity" or their equivalent are used with reference to the body, shell or figure of the toy, the normal center of gravity of the same minus the balancing rods and weights is intended, or in other words the center of gravity of the figure which is disturbed by the said rods and weights so as to cause the figure to describe the falling and recovering motions which simulate the walking of a human being.

What I claim is:

1. In a device of the character described the combination of an outer shell or casing made to resemble human form, a plurality of legs pivoted within the same on a pin or bar mounted in the outer shell, said legs being formed of strips of flat metal with their upper ends bent over and down parallel with the main strip, and provided with alined openings in the downwardly bent portion and strip through which the pin passes, the said pin, a plurality of recesses in the shell adapted to receive the said pin, the said legs being provided with feet on their lower ends having bottom surfaces inclined with respect to the longitudinal diameter of the legs and a medial cut-out portion terminating in a heel having its lower edge pointed forward, a rod attached to the device between the leg pivots and the feet and outside of the same, a weight on the lower end of said rod, and slots in the bottom of the shell through which the legs extend, said slots being parallel with the line of travel of the device.

2. In a device of the character described the combination of an outer shell or casing, a plurality of legs pivoted at their upper ends within the same on a pin or bar mounted in the outer shell, the said pin, a plurality of recesses in the shell adapted to receive the said pin, the said legs being provided with feet on their lower ends having bottom surfaces inclined with respect to the longitudinal diameter of the legs and a medial cut-out portion terminating in a heel having its lower forward edge pointed, a rod attached to the device between the leg pivots and the feet and outside of the same, and a weight on the lower end of said rod.

3. In a device of the character described the combination of an outer shell or casing, a plurality of legs pivoted at their upper ends within the same on a pin or bar mounted in the outer shell, the said pin, a plurality of recesses in the shell adapted to receive the said pin, the said legs being provided with feet on their lower ends having a medial cut-out portion terminating in a heel having its lower edge pointed, a rod attached to the device between the leg pivots and the feet and outside of the same, a weight on the lower end of said rod.

4. In a device of the character described the combination of an outer shell or casing, a plurality of legs pivoted at their upper ends, the said legs being provided with feet on their lower ends having bottom surfaces inclined with respect to the longitudinal diameter of the legs and a medial cut-out portion terminating in a heel having its lower forward edge pointed, a rod attached to the device between the leg pivots and the feet and outside of the shell, and slots in the bottom of the shell through which the legs extend, said slots being parallel with the line of travel of the device.

5. In a device of the character described the combination of an outer shell or casing, a plurality of legs pivoted at their upper ends, the said legs being provided with feet on their lower ends having bottom surfaces inclined with respect to the center line of the legs and a medial cut-out portion terminating in a heel having its lower forward edge pointed, a rod attached to the device outside of the shell.

6. The combination of a body or shell, a plurality of weights connected with the same outside its normal center of gravity, legs pivotally mounted on the body above the point at which the weights are attached and adapted to swing through the said center of gravity and means for limiting the oscillation of the said legs.

7. The combination of a body or shell, a plurality of weights connected with the same outside its normal center of gravity, legs pivotally mounted on the body and adapted to swing through the said center of gravity, means for limiting the oscillation of the said legs, and means for adjusting the position of the pivot of said legs.

8. The combination of a body or shell, a plurality of weights connected with the same outside its normal center of gravity, legs pivotally mounted on the body in the normal center of gravity and above the point at which the weights are attached and adapted to swing through the said center of gravity, and means for limiting the oscillation of the said legs.

9. The combination of a body or shell, a plurality of weights connected with the same outside its normal center of gravity, legs pivotally mounted on the body in the normal center of gravity and above the point at which the weights are attached and adapted to swing through the said center of gravity.

10. The combination of a body or shell, a plurality of weights connected with the same outside its normal center of gravity and located substantially below the legs, legs pivotally mounted on the body in the normal center of gravity and above the point at which the weights are attached and adapted to swing through the said center of gravity.

11. The combination of a body portion, legs pivotally connected therewith and extending from the same, weights connected with the said body portion at a point outside the normal center of gravity of the body, but located substantially in the said center of gravity and below the body, the pivotal connection of the legs being substantially in plane with or above the point at which the weights are attached outside the center of gravity.

12. The combination of a body portion, legs pivotally connected therewith and extending from the same, weights connected with the said body portion at a point outside the normal center of gravity of the body and below the body, the pivotal connection of the legs being substantially in plane with or above the point at which the weights are attached.

13. The combination of a body or shell, legs connected therewith, a weight connected with the same outside its normal center of gravity, means for connecting the said weight to the body extending from a point outside its normal center of gravity to the said weights which are substantially below the legs, and a pivotal connection between said legs and the body, said connection being so located that the said point of weight attachment is constantly at or below the said pivots.

Witness my hand this 10th day of October, 1913.

JAMES J. MAHAN.

In the presence of—
MARY H. LEWIS,
S. J. COX.